United States Patent [19]

DeSimone et al.

[11] Patent Number: 5,787,470
[45] Date of Patent: Jul. 28, 1998

[54] INTER-CACHE PROTOCOL FOR IMPROVED WEB PERFORMANCE

[75] Inventors: Antonio DeSimone, Ocean; David Hilton Shur, Middletown; Sandeep Sibal, Matawan, all of N.J.

[73] Assignee: AT&T Corp, Middletown, N.J.

[21] Appl. No.: 733,485

[22] Filed: Oct. 18, 1996

[51] Int. Cl.$^6$ ................................. G06F 12/00
[52] U.S. Cl. ............... 711/124; 711/165; 395/200.48; 395/200.56; 395/200.6; 395/200.68
[58] Field of Search ................. 395/440, 445, 395/446, 447, 448, 451, 468, 471, 621, 200.53, 473, 608, 610, 200.3, 200.31, 200.32, 200.43, 200.46, 200.48, 200.55, 200.6

[56] References Cited

U.S. PATENT DOCUMENTS

| | | | |
|---|---|---|---|
| 4,959,777 | 9/1990 | Holman, Jr. | 395/468 |
| 5,222,224 | 6/1993 | Flynn et al. | 395/471 |
| 5,226,144 | 7/1993 | Moriwaki et al. | 395/448 |
| 5,452,447 | 9/1995 | Nelson et al. | 395/621 |
| 5,510,934 | 4/1996 | Bremman et al. | 395/446 |
| 5,511,208 | 4/1996 | Boyles et al. | 395/200.53 |
| 5,586,298 | 12/1996 | Shah | 395/473 |
| 5,604,882 | 2/1997 | Hoover et al. | 395/448 |
| 5,611,049 | 3/1997 | Pitts | 395/608 |
| 5,623,656 | 4/1997 | Lyons | 395/610 |

*Primary Examiner*—Tod R. Swann
*Assistant Examiner*—Fred F. Tzeng
*Attorney, Agent, or Firm*—Stephen M. Gurey

[57] ABSTRACT

On the Internet, different caches may contain copies of objects that have been copied from originating servers when they were accessed by users. Interconnected caches may have different objects stored thereon that might at some time be requested by a client terminal that is connected to a cache other than the one on which the object is stored. Rather than awaiting a request for a particular object and then querying each neighbor cache to determine whether a copy of the requested object is stored thereon, and then downloading the requested object if it is found, information about the contents of the neighbor caches is exchanged between these caches so that when a request for an object is received, the object can be retrieved from the cache in which it is stored. In the alternative, the object may be retrieved from the originating server if, for example, the object stored in a cache is stale based on the date and time it was last modified in the cache.

12 Claims, 6 Drawing Sheets

INTER-CACHE PROTOCOL FOR IMPROVED WEB PERFORMANCE

Cross Reference to Related Applications

This application relates to subject matter described in co-pending U.S. Pat. Application Ser. No.08/733/486, filed simultaneously herewith, for Antonio DeSimone and Sandeep Sibal, co-inventors herein, and assigned to the assignee hereof.

TECHNICAL FIELD

This invention relates to data communications and computer networking, and more particularly, to the transfer of digital information on packet data networks such as the Internet, between caches.

BACKGROUND OF THE INVENTION

In a transaction on the World Wide Web between a client terminal and a Web server in which the client terminal retrieves a Web object from a server connected on the Internet, the client terminal normally accesses the Internet through an Internet Access Service Provider (IASP). Such an object may be one or more pages of textual information, a picture, a sound clip, a video clip, a JAVA applet or other software, any combination or the former, or anything that is capable of being transmitted digitally over the Internet to a client terminal. The term "object" will be use hereinafter to include all of the foregoing. A cache, located within the IASP network, functions as an intermediary in transactions involving the retrieval of such Web objects from servers by a client terminal. In particular, in its simplest form, a cache within the IASP saves a copy of a retrieved object for itself when the object is moved from the server to the requesting client terminal. This caching operation is transparent to the user and, under normal circumstances, does not incur any significant delay due to the copying operation which is performed simultaneously as the object is retrieved from the server and delivered to the client terminal.

Advantageously, the cache within the IASP network can satisfy subsequent requests for those objects that are stored therein, thereby obviating the necessity of retrieving the object from the originating server on the Internet. This reduces the delay as perceived by the user to access the object and further, saves bandwidth on links that connect the IASP network to the Internet. FIG. 1 is a block diagram of a prior art network in which plural client terminals, such as 101 and 102, are connected to a cache 103 within IASP 104. Cache 103, in turn, is connected to a server 105 connected to the Internet 106. By storing an object from server 105 in cache 103 when it is first retrieved by client 101, subsequent requests for that same object by client 101, or any another client connected to cache 103 within IASP 104, such as client 102, can be satisfied directly from cache 103. IASP 104 likely also includes a second or more caches, such as cache 107, which serves other clients connected to that same IASP, such as 108 and 109. The objects stored in this second cache 107, or other caches within IASP 104, but not shown, could be used to serve the clients attached to the first cache 103, if the caches communicate with each other.

Generally, in the prior art when a request for an object is received, discovery of objects on other than the cache to which the requesting client is attached is done by explicit querying at the time when the request for a particular object is made. That is, whenever a request from a client cannot be satisfied by the cache to which the client is connected, a plurality of requests are sent out to neighboring caches asking them whether they have a copy of the desired object stored in their memory.

The steps of querying a plurality of caches, waiting for a reply, and then downloading a copy of the object from the cache that has the object or retrieving a copy of the object from the originating server of the object if the object cannot be found in a neighboring cache, may impart a delay to the retrieval process that is unacceptable to the requesting user. Furthermore, the flooding of requests to all neighboring caches in response to each request for an object can be a wasteful use of network bandwidth, as well as draining the caches' computing resources. Even furthermore, the copy of an object as it exists on a neighboring cache may differ from the object as it then exists in the server from which it originated. This will result when the object in the server is modified after the initial request for the object was made and a copy of the object stored in the neighboring cache. Thus, the object available to a requesting cache from a responding cache may not be current and may be a stale or outdated version of the object as it currently exists in the server, and thus not suitable to be supplied to a client requesting that object.

SUMMARY OF THE INVENTION

In accordance with the present invention, a cache is provided information about what objects its neighboring cache carries, and other information about those objects in the neighboring cache, such as the times these objects were modified in the neighboring cache, the type of content of these objects, and the sizes of these objects. The latter information may be useful for planning disk space usage. This information gathering process is distinct from the actual retrieval of an object from a neighboring cache, or in the alternative, from the actual server carrying the most recent version of the object, and is performed asynchronous to a request from any client for the object.

Web caches update each other about Web objects in their cache through various mechanisms. In a first mechanism, a requesting cache queries a responding cache for information about all or a subset of objects in the responding cache that have been modified since a given date and time. "Modified" as used herein includes objects that may have been updated or created in that cache since the given time. In a second mechanism, a responding cache informs the requesting cache periodically about modifications to objects in which that the requesting cache had previously express interest. In third and forth more intelligent mechanisms, neighboring caches maintain state-information on what objects the other caches have based on the messages previously sent to it. In particular, in the third mechanism each cache maintains state-information on objects in every neighbor cache with which it communicates. The fourth mechanism is applicable to the case where numerous peering caches exist, and each of which is interested in each other cache's content. Information that a cache has collected about the content of other caches is then used in together with the content of its own cache for compiling the messages sent to any given cache.

DETAILED DESCRIPTION

As noted, the present invention is a mechanism by which Web caches update each other about what Web objects are in their cache. Update notification is distinct from actually sending the modified Web objects. The notification typically involves information from which the receiving cache can determine what Web objects are stored in the neighboring cache, but also information such as the time when the object in the neighboring cache was last modified. Optionally, the notification may contain other information that might be useful to the requesting cache such as the size, in bytes, of the object to enable the requesting cache to plan its disk space usage, and the type of contents of the object.

To distinguish between the two caches involved in the transfer of information about the objects stored in each, the cache that desires information about the contents of its neighbor cache is referred to hereinafter at the Requesting Cache (RQC), and the neighbor cache that sends out information about what it stores is referred to as the Responding Cache (RSC). The mechanism of the present invention is operable in an environment where some caches may only act as RQCs and others only as RSCs. Specifically in a hierarchical topology, a situation can be envisioned where caches lower in the hierarchy only request information, and those higher up in the hierarchy only respond. "Higher" is used in the sense, that the link to the Internet is at the highest level, and the Web clients or browsers are at the lowest level. Most popular commercial browsers, have caches co-located. Such a client-cache would typically always be a RQC. It may also function as an RSC, if neighboring browsers have the permission to "look" at the private caches of other browsers.

Figure 1:
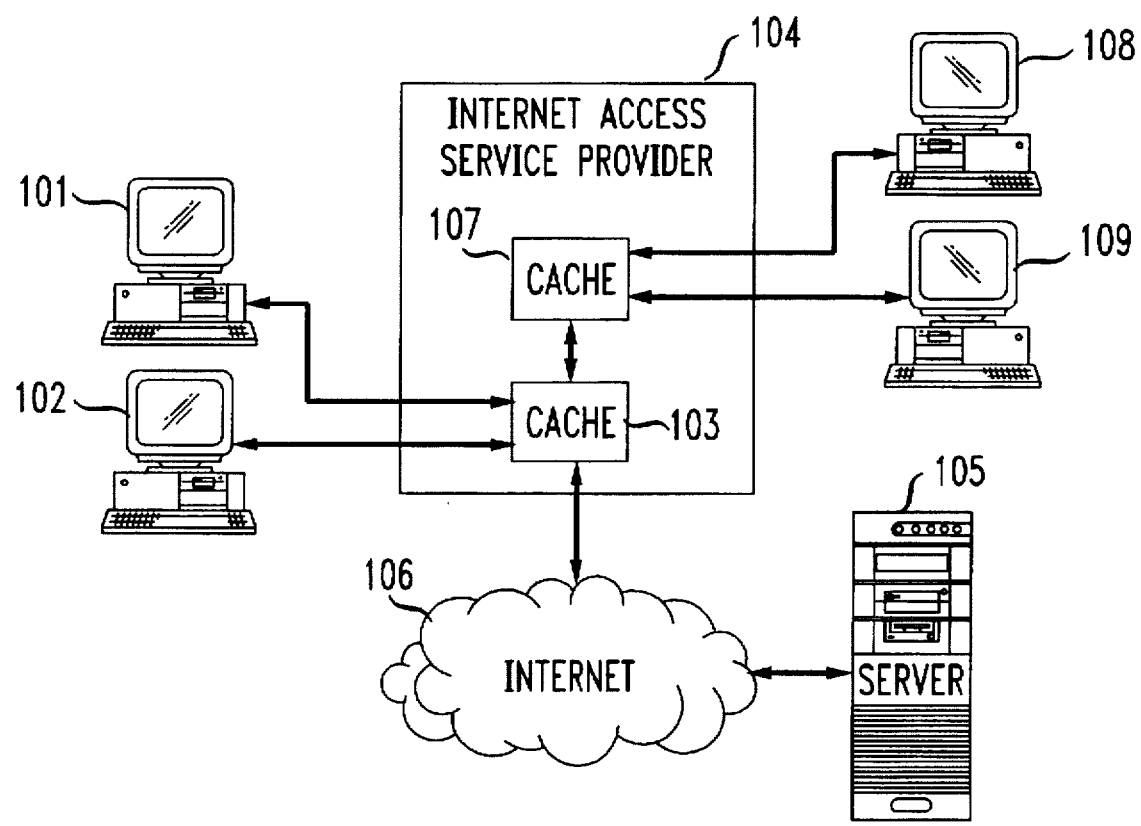
FIG. 1 is a block diagram of a prior art network showing two caches connected within an Internet Access Service Provider, interconnecting client terminals and a server within the Internet.
Figure 2:
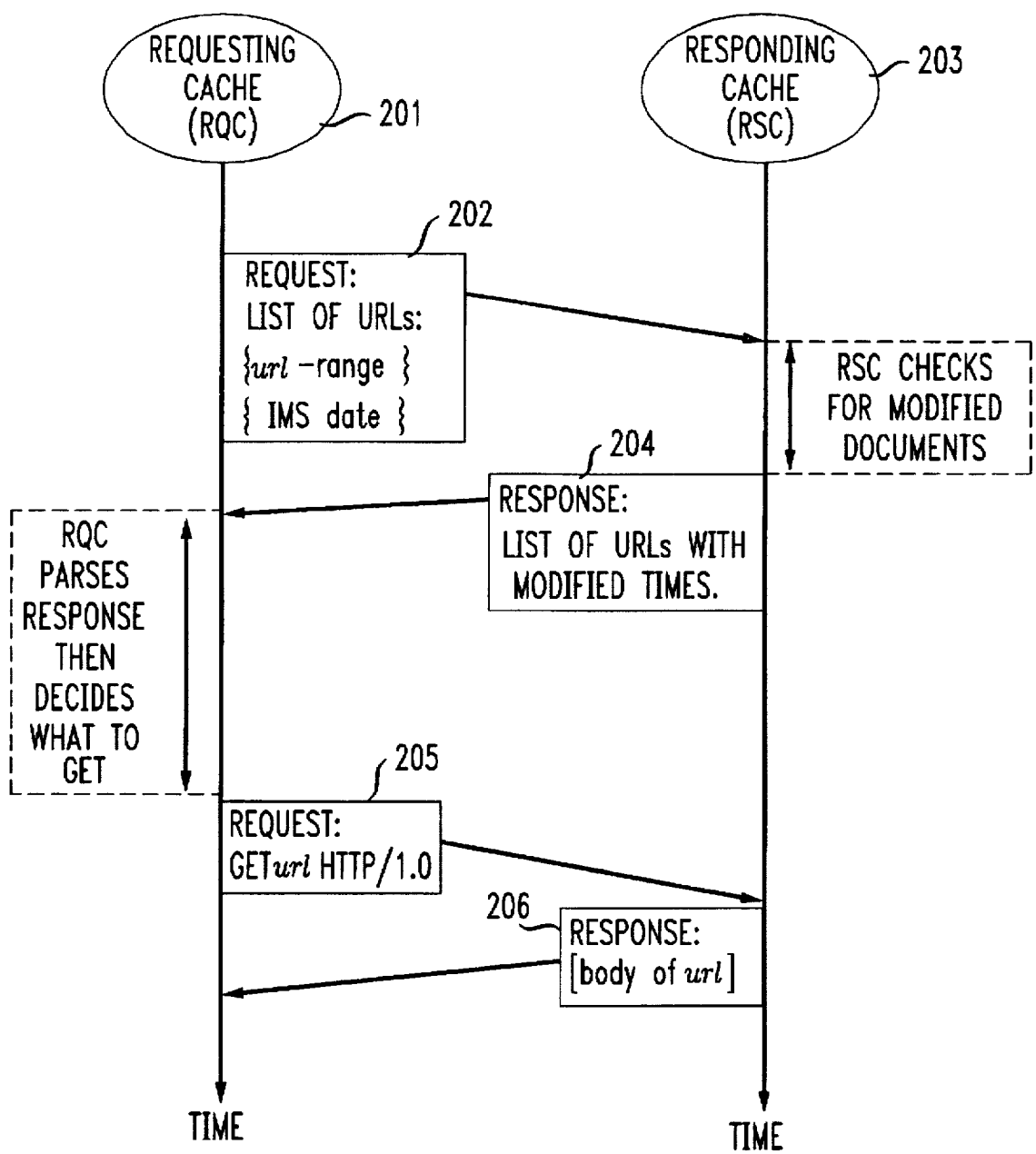
FIG. 2 shows the interactions between a requesting cache and a responding cache along a time-line in accordance with a requesting cache-initiated notification mechanism of the present invention.

FIG. 2 illustrates the mechanism for a RQC-initiated notification. In this mechanism the RQC 201 initiates a request 202 to the RSC 203 to inform it about all or a subset of objects that are stored in RSC 203 and have been updated within RSC 203 since a given date and time or are new to RSC 203. As previously noted, the term "modified since a given date and time" as applied to objects shall be used to mean those objects that are new to the RSC since that time and date, as well as those objects that have been updated since that time and date. The address list of URLs in the request may include objects with individual URLs, or a plurality of objects within a range of URLs using a wildcard symbol to represent all those objects whose URLs share address commonality. As noted, this request may include a request for information about both updates to existing objects previously stored in RSC 203 as well as objects that have been newly added in RSC 203. The request 202 includes an "if modified since" (IMS) date, thereby indicating to the RSC that information about objects is requested only if the object has been modified in the cache or newly added to the cache since that IMS date.

In response to request 202, RSC 203 checks those listed URLs to determine whether the object has in fact been modified in the cache since the IMS date. The response 204 thereto is a list of those URLs that in fact have been modified in the RSC since the IMS date, together with the times at which those URLs were modified. This information may also include the size of the requested URL object, as well as other information about the object, such as the type of content of the object. The RQC 201 then parses the response and decides, using the retrieved information about those requested URLs, specifically which URLs it desires to download to itself. This downloading can in fact be done on its own, based on its own set of rules, or may be done at a later time in response to an actual request for that object by a user who is connected to RQC 201. If, either on its own, or in response to a request from a user, RQC decides to retrieve the object with URL url, it makes a request 205 to GET the object with URL url using the HyperText Transfer Protocol (HTTP), which is the predominant World Wide Web Internet protocol. The RSC 203, in reply to that GET request, sends a response 206 back to RQC 201 that includes a copy of the body of the object with URL url that is has stored.

Figure 3:
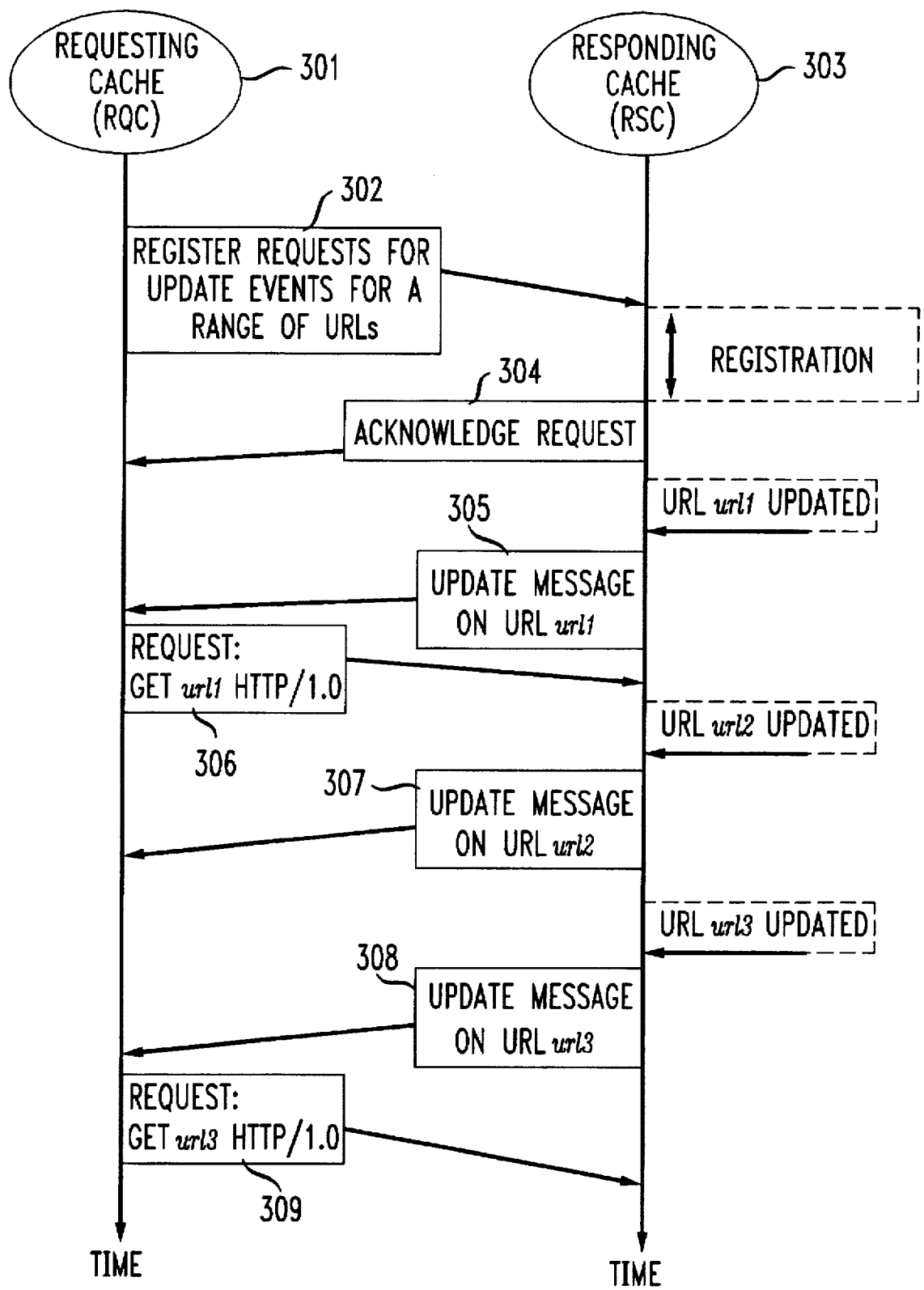
FIG. 3 shows the interactions between a requesting cache and a responding cache along a time-line in accordance with a responding cache-initiated notification mechanism of the present invention.

FIG. 3 illustrates a mechanism for an RSC-initiated scheme in which the RSC tells the RQC every so often about changes to objects in which the RSC had previously expressed interest. In a first mode, information about objects that have been modified is transmitted to the RSC on a periodic basis. In a second mode, information is sent whenever a requested object in fact is updated or created in the RQC. Both modes can co-exist. In the second mode, the RQC 301 first registers a request 302 with RSC 303 for update events for a range of URLs. The RSC 303 then registers those requests and transmits an acknowledgment 304 back to RQC 301. After registration, RSC 303 transmits an update message back to RQC 301 whenever one of those registered URLs is modified. Thus, when URL url1 is modified, a message 305 containing information about the object is transmitted to the RQC 301. In response thereto, RQC 301 may decide to make a request 306 to GET url1 using the HTTP/1.0protocol. Alternatively, in response to an information message that a particular URL has been modified, the RQC 301 may decide not to download it. Thus, as noted in FIG. 3, when URL url2 is modified and an update message 307 on URL url2 is transmitted to RQC 301, the RQC decides not to make a request to download the modified url2. In a similar manner, when URL url3 is modified and a message transmitted to RQC 301, the RQC makes a request to download the modified object.

The motivation of the present invention for simply sending notification messages instead of the Web objects themselves is twofold. Firstly, it enables a sense of cache coherency even if the RQC may not have space left on its system to copy the Web object itself. Since this is done asynchronous to user requests, and not as a consequence to a request, caches know ahead of time what other caches carry, and therefore can save delay as perceived by the user (by preventing fruitless queries to neighbor caches), as well as network and cache resources. Secondly, the invention permits a logical separation between information regarding the modification time of an object, and the content of the object itself. A cache can therefore choose what objects it would like to refresh or cache, before it downloads them. Since the information carried can include other aspects of the object, such as the size in bytes, the cache is better prepared before downloading the object. For example, the size of a particular object may be very large and the cache may choose not to download it due to insufficient storage capacity.

Following the exchange of information about the Web objects stored in neighboring caches, the new or modified Web objects can be retrieved either individually or as a batch using multipart messages, Keep-Alive connections, or compression, or any other scheme.

As previously noted, documents that have been updated at a cache since a given date and time are with respect to activities at the cache, not at the server from which the object originates. Thus, a document that has been modified at a cache after time t1, might well have been modified at the server at a time t2<t1.

In the previously described RSC-initiated mechanism of FIG. 3, every so often the RSC sends to the RQC information on all objects it has in its cache that have been modified or created at the cache since the last message it had sent to the RQC in the previous epoch. This mechanism is extended so that the RQC automatically responds by sending back to the RSC another message which has a list of all objects it has it its cache that have been modified since the last interaction it had with the RSC in the previous epoch. This combined mechanism is similar to the mechanism of FIG. 3, but is one in which both neighbor caches become both requesting and responding caches. In this mechanism, the request becomes implicit in every response. Since the difference between a "request" and a "response" is now blurred, the term "message" will be used instead.

Figure 4:
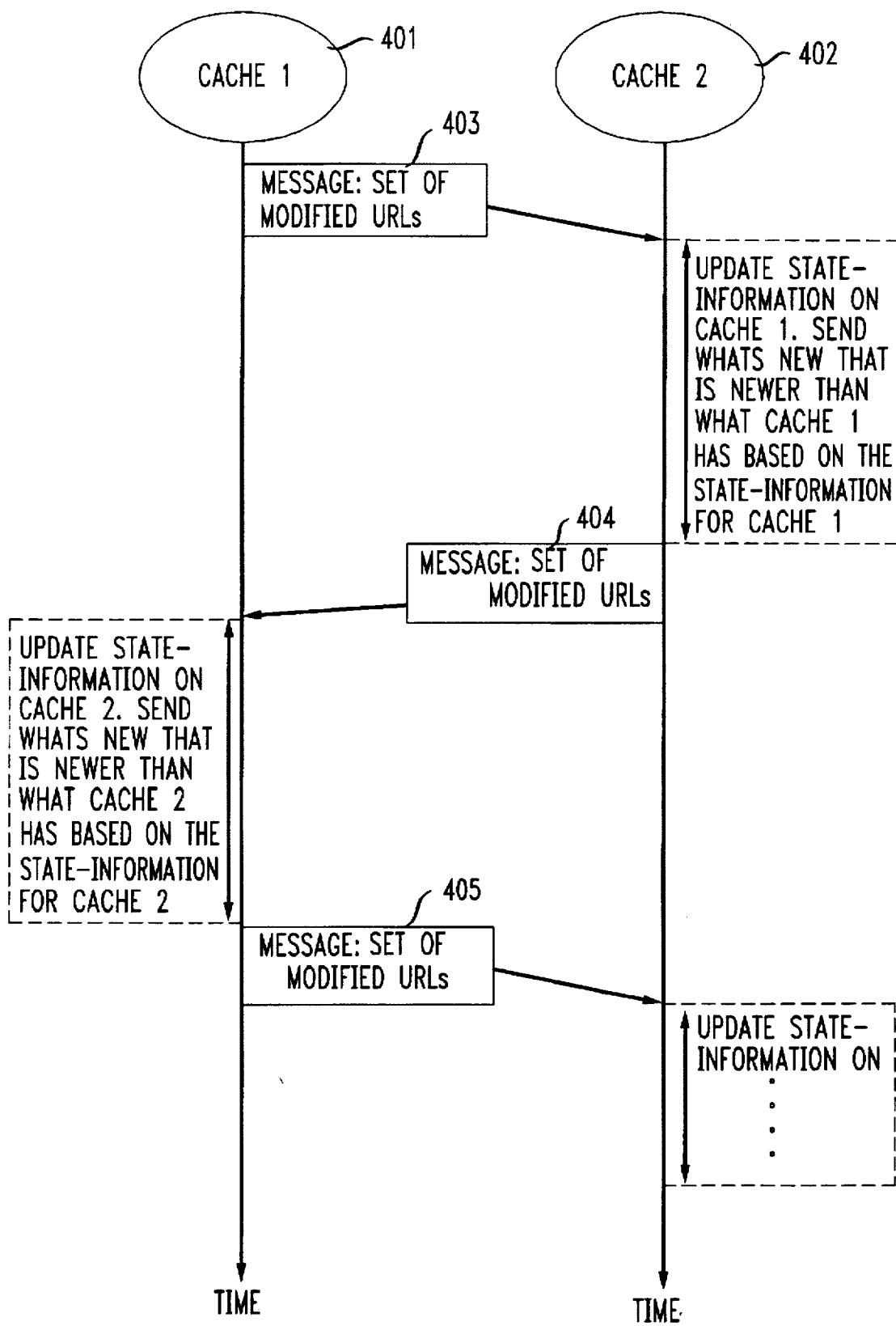
FIG. 4 shows the interaction between two caches in which each cache maintains separate state-information for each of the other neighbor caches with which it communicates.

A more intelligent scenario can be considered. Here, caches maintain state-information on what other caches have, partly based on the messages sent to it. Once this state-information is available, messages sent back and forth can be further streamlined. Specifically, it is useless to send messages about updated objects at one's cache to a neighbor for which is known, from the neighbor's previous message, has a more recent or equally recent version of the object. This third mechanism, shown in FIG. 4, is only viable between caches that can act as both RQCs and RSCs. This mechanism is particularly designed for use for the case when peering caches within an IASP are interested in knowing about all the modified objects on all the caches. While this mechanism requires each cache to maintain some state information about what is on its neighbors's caches, it significantly reduces communication overhead, especially when the number of objects in each cache is large.

In the mechanism of FIG. 4, cache 401 sends neighbor cache 402 a message 403 containing information about a set of URLs. When cache 402 receives that message, it updates the state-information it has accumulated on its neighbor cache 401. Cache 402 then, based on the state-information that cache 402 has on cache 401, sends a message 404 that contains information about a set of modified URLs that is newer than what cache 401 has. When message 404 is received by cache 401, the state-information cache 401 has on cache 402 is updated and, based on that state information, information about URLs that is newer than what cache 402 has is sent to cache 402 in message 405. This algorithm is repeated at caches 401 and 402 in response to each received message from the other.

In this mechanism, each cache maintains state-information (as a table) on every neighbor cache with which it communicates. Each table is essentially a list of URLs with their modification times at the cache. Each item in the list is thus a 2-tuple of the form: $(url_i, t_i)$ where $t_i$ is the modified time of the object identified by URL $url_i$. It should be noted that there may exist a document at the original server/site that is newer than what the cache has, with a modification time later than $t_i$. However, the table simply lists the most recent document that the neighboring cache has based on knowledge built up from messages that the neighboring cache has issued.

The table is updated as follows. Every message from the neighboring cache comprises a lists of URLs with associated modification times. For each item (url, t) the following operation is used. Let $(url_i, t_i)$ be an entry in the table. If $url=url_i$: replace $(url_i, t_i)$ by (url, t) in the table. If a URL that the neighbor has been purged from the cache, that URL is also sent, with t set to a negative value (indicating that it has been purged). Let the list of new URLs (since one's last response to the neighboring cache) stored in one's own cache consist of a set of 2-tuples in the form $(url_x, t_x)$. Each of these is sent in the response message unless $url_x=url_i$ and $t_x<=t_i$. In other words, this means, send $(url_x, t_x)$, unless the table for cache i, represented by $(url_i, t_i)$ suggests that cache i has an equally or more recent version of the document.

The previously described mechanism of FIG. 4 can be further streamlined for the case of an IASP where numerous peering caches exits, each of which are interested in every other cache'S s content. In this mechanism, illustrated in FIG. 5, information that a cache has collected about content on other caches is also used in addition to the content on its own cache in compiling messages to any given cache. This mechanism further reduces overhead because each cache does not have to directly exchange messages with all other caches. It also needs to only maintain a single state for the entire caching system instead of separately maintaining the state for each peering cache; the sum of state information on all caches being much larger than the state of the entire caching system. Theoretically, as long as the set of caches have direct or indirect connections, this mechanism will be able to diffuse information on all caches correctly. In graph-theoretic terms, as long as the inter-cache communication channels link up the caches in a "tree", this mechanism will work. To prevent against failure of caches and communication channels, and to reduce end-to-end communication delays, a "2-connected" or "3-connected" tree might be more appropriated, where a "k-connected" tree is one where, if any (k-1) of its links are destroyed, the set of nodes still remains connected.

Figure 5:
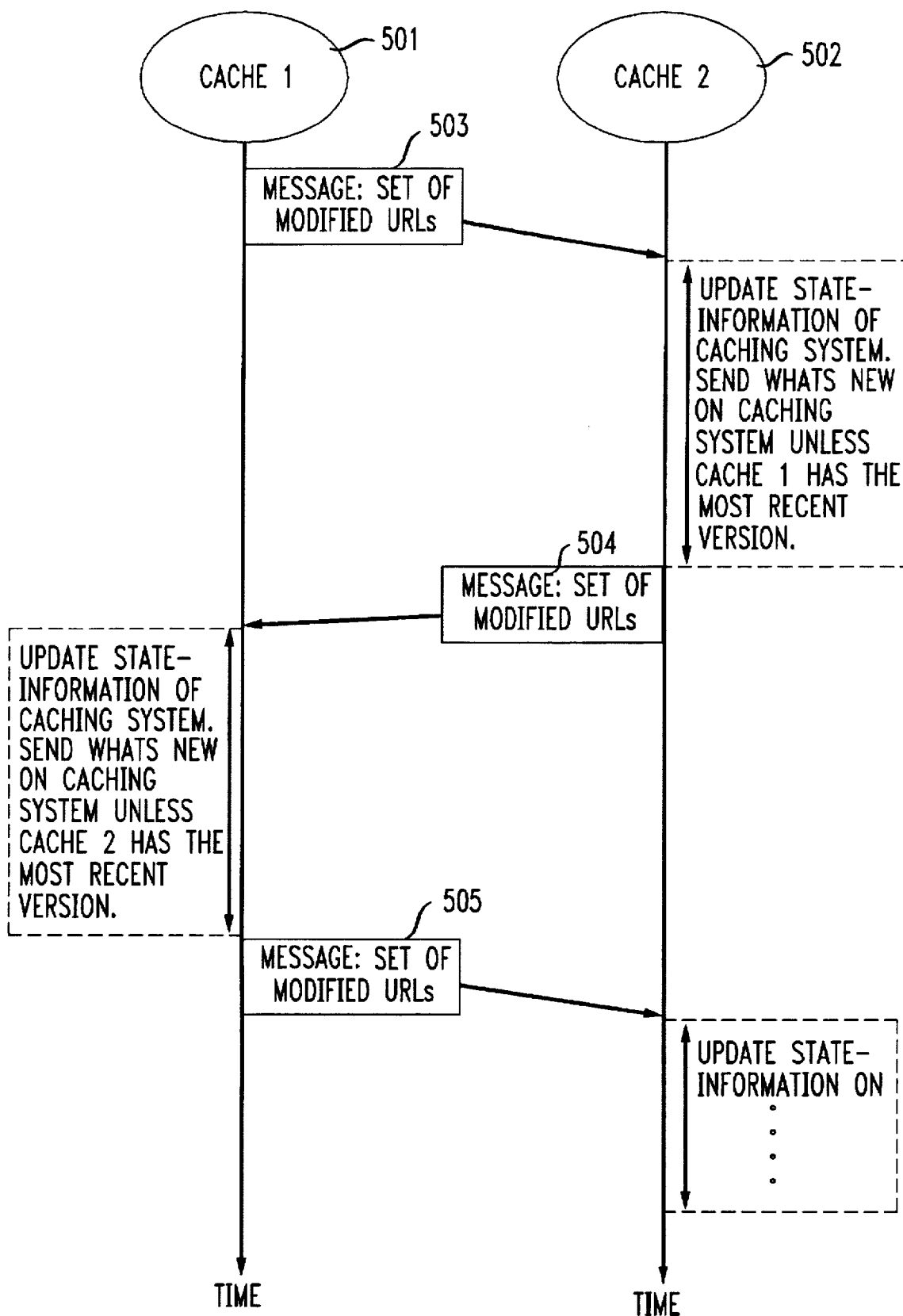
FIG. 5 shows the interaction between two caches in which each cache maintains single-state information for the entire caching system.

Since this mechanism diffuses information on other caches in its messages, the messages transmitted between caches need to be expanded from the 2-tuples of the previously described mechanism, to a 3-tuple of the form $(url_i, t_i, c_i)$, where $c_i$ is the cache which actually has stored the object referenced by $url_i$, and where, as before, $t_i$ is the modified time of the object $url_i$. In those cases where multiple caches have equally recent objects, the last item in the 3-tuple is itself a set of caches. In FIG. 5, every time a message (503 or 504) from either cache 501 or 502 arrives at the other consisting of a list of items of the form (url, t, c), if $url =url_i$ and $t>t_i$, replace $(url_i, t_i, c_i)$ by (url, t, c) in the state table. However, if $url=url_i$ and $t=t_i$, append c to the set $c_i$ as well, if c is not already present in the set $c_i$. Let the list of new URLs (since one's last response to the neighboring cache) one knows about consist of a set of 3-tuples of the form $(url_x, t_x, C_x)$. Each of these are sent in the response message unless $C_x \epsilon c_i$. Thus, as noted in FIG. 5, the message sent to a neighbor cache in response to receiving a set of modified URLs from that neighbor cache is a list of URLs that are that new on the caching system unless the neighbor to which the response is directed has the most recent version of the URL.

The above-described mechanisms can be implemented in various ways. A possible implementation of the RQC-initiated mechanism is described below. This mechanism is realized by defining a new method called CONTENTS to the HyperText Transfer Protocol (HTTP). Alternate designs are possible, that may use a separate protocol suite, outside of HTTP.

Figure 6:
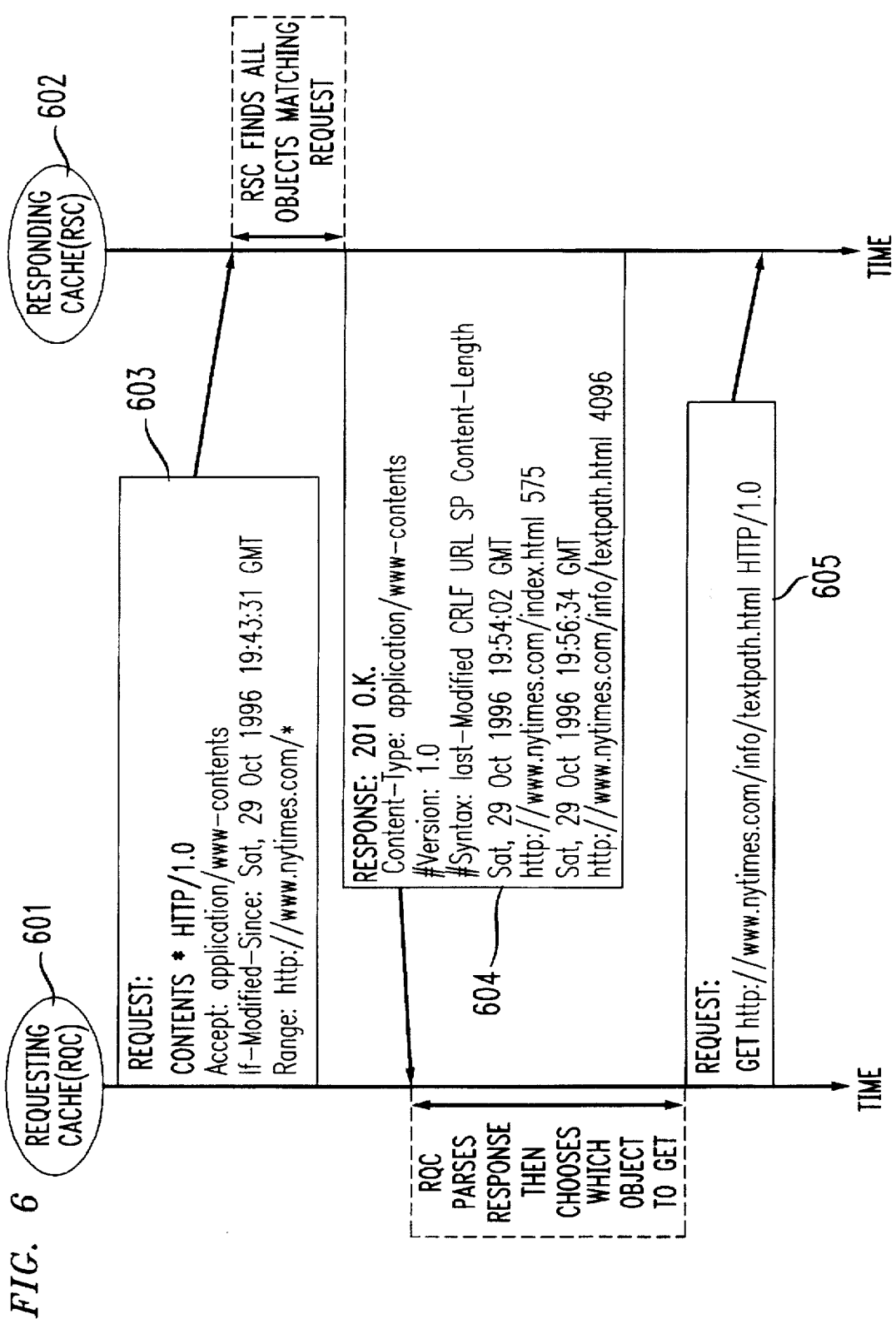
FIG. 6 shows the message interaction between a requesting cache and a responding cache for a specific implementation of a requesting cache-initiated mechanism in accordance with the present invention.

FIG. 6 illustrates the protocol mechanism for a RQC-initiated notification mode between RQC 601 and RSC 602. In the Request made to the RSC for information about specific URLs, the HTTP/1.0 and HTTP/1.1 syntax for the Request-Line is:

Request-Line=Method SP (space) Request-URL SP HTTP-Version CRLF (Carriage Return Line Feed)

and the syntax for the Request-URL is:

Request-URL="*"|absoluteURL | abs-path

This does not permit expressing complete set of URLs. "*" is therefore chosen as the Request-URL, which fortuitously means that by default the request pertains to all of the contents of the serving cache or RSC. The Request-Line is thus:

Request-Line="CONTENTS" SP "*" SP HTTP-Version CRLF

The If-Modified-Since field in the request header is used to specify that only those content changes that took place after the date specified by the If-Modified-Since field are of interest. This field is a departure from the way this field is normally used in the GET method. In the latter, the IMS field specifies that the document is of interest only if the actual modification time is more recent than the IMS field. Here, the IMS field is used to indicate interest in the document only if the document has been modified at the cache since the IMS time. The Range field is used to specify the URLs that are of interest. This is a field whose syntax has yet to be specified in HTTP/1.1, and it would desirable if all regular expressions can be expressed by this field. If this should be insufficient, a new field may need to be created to this purpose. What is desired here is that if a RQC is only interested in some select HTML pages, for example all the HTML pages of the New York Times except those from the Sports Section, and the JPEG images of the Louvre, it should be able to specify that union using the Range field. Finally, the Unless field is used to specify any other restriction the cache many want to apply on the URLs that interest it. The new application type termed application/www-contents is also defined to support the response that the responding cache returns.

In FIG. 6, in request 603, the request line is:

CONTENTS * HTTP/1.0 wherein CONTENTS is the method requesting is a list of URLs, the "*" means that the method is controlled by protocol, and that HTTP/1.0 is that protocol. This line is followed by a CRLF. The next line is:

Accept: application/www-contents which means that if the RSC sends the RQC a response in accordance with that defined application, the RQC will be able to understand it. The next line is:

If-Modified-Since: Sat, 29 Oct 1996 19:43:31 GMT which means that only URLs that have changed since Sat., 29 Oct. 1996 at 19:43:31 GMT are of interest. The last line is:

Range: http://www.nytimes.com/*

This defines the range of URLs which are of interest, with "*" indicating that all "www.nytimes.com" objects are of interest.

The response to the RQC needs to follow a specific format. Instead of defining this within the protocol, it is left to the RSC to specify the format, although the format definition itself needs to have a specific syntax. The format of the contents file contains a sequence of lines containing ASCII characters terminated by either the sequence LF (line feed) or CRLF. Content file generators should follow the line termination convention for the platform on which they are executed. Each line may contain either a directive or a (part of a) entry. Entries consist of a sequence of fields relating to a single HTTP object. If a field is unused in a particular entry, "-" marks the omitted field. Directives provide information about the version, as well as header fields of the objects that follow. Lines beginning with the # character contain directives. The following directives are defined:

* Version: <integer>.<integer>

The version of the extended log file format used.

Syntax: [<specifier> . . . ]

Specifies the fields recorded in the log. The strings SP and CRLF have special meaning.

Remark: <text>

Comment information. Data recorded in this field should be ignored by analysis tools.

The directives Version and Syntax are required. The Syntax directive may appear multiple times, with the understanding that all entries obey the Syntax directive that is above and closest to them. The Syntax directive specifies the data recorded in the fields of each entry.

In the response message 604, the line "201 O.K." indicates that the request was understood and that a valid response follows. Content-Type on the next line indicates that the a special document with a certain syntax follows that is not just textual in nature. The directive #Version defines the type of syntax, specifically version 1.0. The directive #Syntax: Last-Modified CRLF URL SP Content-Length indicates that what follows will have the format of the last modified date, on a next line, the URL that has been modified at the RSC 602, followed by a space and the size of the object in bytes. Thus the response 604 indicates that two objects matched the request 603. The first object has URL http://www.nytimes.com/index.html, having been last modified in RSC 602 on Sat., 29 Oct.1996 at 10:54:02 GMT, and having a length of 575 bytes. The second object has a URL of http://www.nytimes.com/info/textpath.html having been last modified in RSC 602 on Sat., 29 Oct.1996 at 19:56:34 GMT, and having a length of 4096 bytes.

RQC 601, receives response 604 and chooses which objects to GET from RSC 602. Thus, as noted in FIG. 6, RQC 401 issues a request 605 to GET http://www.nytimes.com/info/textpath.html HTTP/1.0, from RSC 602. RSC 602 subsequently fills that request by forwarding the body of that object back to RQC 601.

Although described in connection with neighboring caches within an IASP, the present invention could be used for exchanging information about objects stored in caches on Web browsers, or between caches on Web browsers and caches within an IASP, or between caches that can communicate with each within any locations or between any locations.

The above-described embodiments are illustrative of the principles of the present invention. Other embodiments may be devised by those skilled in the art without departing from the spirit and scope of the present invention.

The invention claimed is:

1. In a system comprising at least a first and a second interconnected Web caches on a packet data network, which each stores Web objects that can be retrieved by a plurality of client terminals connected to either Web cache, the Web objects stored in the first and second Web caches being copies of Web objects received from Web servers connected on the packet data network, a method comprising the steps of:

receiving a signal at the second Web cache from the first Web cache that is indicative of a request for information relating to Web objects stored in the second Web cache; and transmitting a signal from the second Web cache to the first Web cache that provides the requested information relating to Web objects stored in the second Web cache.

2. The method of claim 1 further comprising the steps of:

receiving a request for a copy of a Web object stored in the second Web cache from the first Web cache in response to receiving the information relating to Web objects stored in the second Web cache; and providing a copy of the requested Web object to the first Web cache in response to the request for a copy of the Web object in the second Web cache.

3. The method of claim 1 wherein the signal requesting information relating to Web objects stored in the second Web cache is received asynchronous with a request for a copy of a Web object by a client terminal connected to either the first or second Web cache.

4. The method of claim 1 wherein the requested information relating to Web objects stored in the second Web cache comprises information relating to what Web objects are stored in the second Web cache.

5. The method of claim 1 wherein the requested information relating to Web objects stored in the second Web cache comprises information relating to the time a Web object was modified in the second Web cache.

6. The method of claim 5 wherein the requested information relating to Web objects stored in the second Web cache further comprises information relating to the size of a Web object in the second Web cache.

7. The method of claim 1 wherein the step of receiving a signal at the second Web cache from the first Web cache that is indicative of a request for information relating to Web objects stored in the second Web cache comprises the step of receiving a registration request for information relating to when Web objects are modified in the second Web cache.

8. The method of claim 7 wherein the signal transmitted from the second Web cache to the first Web cache that provides the requested information relating to Web objects stored in the second Web cache is transmitted when a Web object is modified in the second Web cache.

9. The method of claim 7 wherein the signal transmitted from the second Web cache to the first Web cache that provides the requested information relating to Web objects stored in the second Web cache is transmitted on a periodic basis.

10. The method of claim 1 wherein the signal received at the second Web cache from the first Web cache that is indicative of a request for information relating to Web objects stored in the second Web cache comprises information on a set of Web objects that have been modified in the first Web cache, and the signal from the second Web cache to the first Web cache that provides the requested information relating to Web objects stored in the second Web cache comprises information on a set of Web objects that have been modified in the second Web cache.

11. In a system comprising at least a first and a second interconnected Web caches on a packet data network, which each stores Web objects that can be retrieved by a plurality of client terminals connected to either Web cache, the objects stored in the first and second Web caches being copies of Web objects received from Web servers connected on the packet data network, a method comprising the steps of:

receiving at the second Web cache from the first Web cache information relating to Web objects that have been modified in the first Web cache, updating state-information stored at the second Web cache relating to Web objects stored in the first Web cache in response to the information received from the first Web cache relating to Web objects that have been modified in the first Web cache; and transmitting information to the first Web cache from the second Web cache relating to those Web objects in the second Web cache that have been modified in the second Web cache after those Web objects have been modified in the first Web cache in accordance with the updated state information relating to Web objects stored in the first Web cache.

12. In a system comprising a first Web cache, a second Web cache and at least one other Web cache, the first, second and at least one other Web cache being interconnected on a packet data network, each Web cache storing Web objects that can be retrieved by a plurality of client terminals connected to any Web cache, the Web objects stored in the first, second and the at least one other Web caches being copies of Web objects received from Web servers connected on the packet data network, a method comprising the steps of:

receiving at the second Web cache from the first Web cache information relating to Web objects that have been modified in the first Web cache and information that the first Web cache has on Web objects that have been modified in all other Web caches in the system;

updating state-information stored at the second Web cache relating to Web objects stored in the first Web cache and all other Web caches in the system in response to the information received from the first Web cache relating to Web objects that have been modified in the first Web cache and information that the first Web cache has on Web objects that have been modified in all other Web caches in the system; and transmitting to the first Web cache from the second Web cache, information relating to those Web objects in the second Web cache that have been modified in the second Web cache and information that the second Web cache has relating to Web objects that have been modified in all other Web caches, in accordance with the updated state-information stored at the Web second cache relating to Web objects stored on all Web caches.

* * * * *